(12) United States Patent
Cross et al.

(10) Patent No.: US 7,254,583 B2
(45) Date of Patent: Aug. 7, 2007

(54) FRAMEWORK FOR SHARED PHYSICAL MODELS IN A MULTI-DATABASE INSTALLATION

(75) Inventors: Michael W. Cross, Portsmouth, NH (US); Joseph T. Wissmann, Chelmsford, MA (US)

(73) Assignee: International Business Machines Corporation, Armonk, NY (US)

( * ) Notice: Subject to any disclaimer, the term of this patent is extended or adjusted under 35 U.S.C. 154(b) by 664 days.

(21) Appl. No.: 10/740,700

(22) Filed: Dec. 19, 2003

(65) Prior Publication Data

US 2005/0138059 A1 Jun. 23, 2005

(51) Int. Cl.
*G06F 17/30* (2006.01)
(52) U.S. Cl. .................................................. 707/102
(58) Field of Classification Search ............... 707/100, 707/102, 200, 1, 2, 10; 395/401
See application file for complete search history.

(56) References Cited

U.S. PATENT DOCUMENTS 5,758,345 A * 5/1998 Wang ......................... 707/100

OTHER PUBLICATIONS

Author Unknown, *Logical Database Design and the Relational Model*, Chapter 11—Database Design http://home.satx.IT.com/academic/cs315/Chapter11.html (visited Nov. 26, 2003).

Carkenord, Barbara A., *Why Build A Logical Data Model*, The Knowledge Exchange Company, Embarcadero Technologies, Inc.

Author Unknown, *Application Life Cycle Management*, AllFusion Erwin Data Modeler, Copyright © 2003 Computer Associates International, Inc. http://www3.ca.com/Solutions?Overview.asp?ID=260&TYPE=S (visited on Nov. 26, 2003).

\* cited by examiner

*Primary Examiner*—Etienne P LeRoux
(74) *Attorney, Agent, or Firm*—Stephen Keohane, Esq.; Steven M. Greenberg, Esq.; Carey Rodriguez Greenberg & Paul LLP

(57) ABSTRACT

The present invention is a method, system and apparatus for generating parameterized installation scripts to accommodate the installation of multiple databases sharing similar physical constructs. The method of the invention can include the step of creating a database which can achieve the foregoing stated advantages of the present invention, a parameterized description of a physical data model can be first combined with a set of database specific properties to produce a physical database. A parameterized description of a logical data model can be second combined with the set of database specific properties to generate a logical model for the physical database. The first combining step can include the step of creating at least one bufferpool in the physical database as specified by the properties. Also, the first combining step can include the step of creating at least one tablespace in the physical database as specified by the properties.

16 Claims, 3 Drawing Sheets

FRAMEWORK FOR SHARED PHYSICAL MODELS IN A MULTI-DATABASE INSTALLATION

BACKGROUND OF THE INVENTION

1. Statement of the Technical Field

The present invention relates to the field of data modeling, and more particularly to the creation and installation of a database.

2. Description of the Related Art

Data represents a significant aspect of the conventional data processing application. A strong and well-architected data structure can facilitate the design of diverse processing, user interface, reporting and statistical analysis tools. Equally as significant, the business requirements of a data processing application dictate the purpose of the application. The most elegant and technologically advanced application will fail its user base if the application does not meet the specified business requirements. Logical data modeling addresses both important aspects of data processing application design.

Database creation and installation generally starts with logical data modeling, followed by physical design and installation. From an application point of view, the logical data model can include those business entities, their relationships, and processes as dictated by business policy and processes. From a database technology perspective, the logical data model is the database language specification of the objects defined within the database. That is, the logical data model defines entities in terms of database objects such as tables, views, columns, data types, constraints, triggers, access privileges, and the like. Importantly, the logical data model itself is not a database.

In comparison to the logical data model, the physical database design is the physical realization of the logical data model. The physical database design can include physical database specifications, for instance database size and location, data creation, updating, and loading details, and data access mechanisms. For example, container lists or drive specifications determine where the data can exist within the database, while page size and disk striping specifications determine how the data is to be inserted on disk. The physical characteristics also determine how system resources are to be used. For example, a buffer pool definition can specify how much memory is to be allocated by the database for data caching and retrieval.

Conventional software development tools have been created which can facilitate the creation both of a logical data model for a database, and for the translation of the logical data model into a physical database design. Many conventional software development tools further can generate database installation scripts for automating the installation of a physical database based upon a logical data model and a physical database design. Using more advanced data modeling tools, not only can the physical structuring of a database be established, but also embedded logic such as stored procedures and triggers further can be incorporated into the database.

Notably, the most advanced of software development tools configured for data modeling and database creation can generate installation scripts based upon the specification of a logical data model and a physical database schema. In this regard, these advanced software development tools can scale the installation of a single database from a single database server to a vast enterprise incorporating scores of database servers and server farms. Moreover, as the number of database designers increases in a data processing application design effort, advanced data modeling tools can coordinate the collaborative effort. Still, even the most advanced data modeling tools lack the functionality for generating installation scripts for more complex scenarios such as where multiple databases sharing similar physical database specifications are to be installed in one or multiple database servers.

SUMMARY OF THE INVENTION

The present invention addresses the deficiencies of the art in respect to database creation and installation and provides a novel and non-obvious method, system and apparatus for generating parameterized installation scripts to accommodate the installation of multiple databases sharing similar physical constructs. A system which has been configured to accommodate the installation of multiple databases sharing similar physical constructs can include a parameterized physical data model, a script generator and an installer.

The parameterized physical data model can be associated with a corresponding properties file, which realizes the parameterized values. The script generator can be configured to produce a parameterized logical data model creation script based upon a logical data model and the parameterized physical data model. Finally, the installer can be configured to process the parameterized logical data model to produce executable physical and logical data models for a target database platform based upon properties produced for the target database platform.

The parameterized logical data model can include a data definition language compliant script produced with parameterized values for particular physical aspects of the target database platform. In particular, the parameterized physical data model can include parameterized aspects of the target database platform, the aspects including physical database specifications. The physical database specifications can include, for illustrative purposes only, buffer pool and tablespace specifications which are common specifications for at least one well-known commercially available database management system.

In a method for creating a database which can achieve the foregoing stated advantages of the present invention, a parameterized description of a physical data model can be first combined with a set of database specific properties to produce a physical database. A parameterized description of a logical data model can be second combined with the set of database specific properties to generate a logical model for the physical database. In an exemplary albeit nonexclusive aspect of the invention, the first combining step can include the step of creating at least one bufferpool in the physical database as specified by the properties. Also, the first combining step can include the step of creating at least one tablespace in the physical database as specified by the properties.

In a preferred aspect of the invention, the method can include the step of configuring the parameterized description of a physical data model with at least one schema name for a table described in the parameterized description of a physical data model. In yet another preferred aspect of the invention, the method can include the step of configuring the parameterized description of a physical data model with at least one user name of a use authorized to access a table described in the parameterized description of a physical data model. Significantly, in the preferred embodiment of the present invention, each of the first and second combining steps can be repeated for multiple other databases having respective database specific properties.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is system, method and apparatus for producing and processing parameterized logical and physical data models to generate a physical database. In accordance with the present invention, separate physical and logical data models can be produced for use in the generation of a database. Both the physical model and the logical model can be parameterized for selected values to be specified for the target platform. In this regard, the logical and physical models can be processed to produce installation scripts also having parameterized physical constructs. The physical parameters can be specified at the time of installing the database, for instance through the user interface of an installation wizard.

Figure 1:
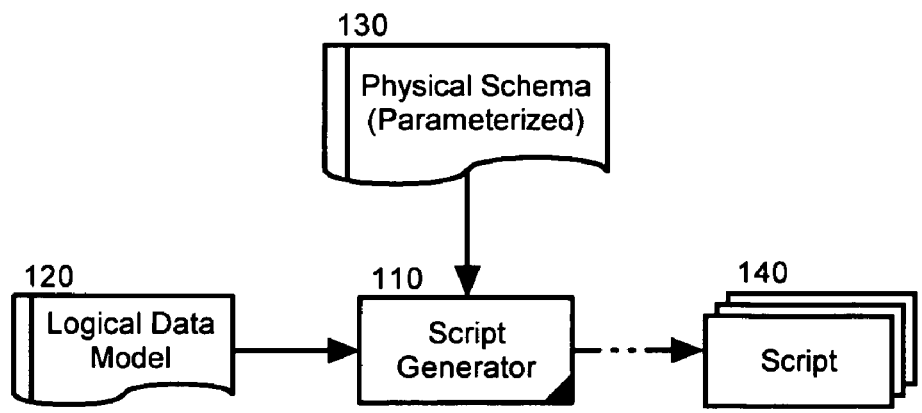
FIG. 1 is a schematic illustration of a system for producing a parameterized script for creating a logical data model.

In more particular illustration, FIG. 1 depicts a system for producing one or more parameterized scripts corresponding to one or more target databases. The system can include a script generator 110 coupled to each of a logical data model 120 and a physical data model 130. The logical data model 120 can be a document produced by a data modeling system to represent a conceptual view of a database irrespective of the underlying physical structure of the database. The physical data model 130, by comparison, can be a document describing the underlying physical configuration for the database.

The script generator 110 can produce one or more parameterized logical model creation scripts 140 describing the logical data model in parameterized fashion. The script generator 110 can produce each one of the scripts 140 based upon the combination of the logical data model 120 and a parameterized physical data model 130 for a target database. Importantly, the physical data model 120 can include parameters or tokens for the physical specifications of a corresponding target database which can be specified prior to installation. Accordingly, for the specified target database, the script generator 110 can produce one or more logical model creation scripts 140 having parameterized physical specifications.

Each of the parameterized scripts 140 can be DDL-like in that it can conform to the Data Definition Language known in the art to physically establish record types, fields and structural relationships in a database. An exemplary script follows:

| Schema Version Information |
|---|
| CREATE TABLE @DBSCHEMA@.VERSION<br>(<br>    oid              CHAR(20)       NOT NULL,<br>    version_major  INTEGER        NOT NULL,<br>    version_minor  INTEGER        NOT NULL,<br>    version_dev    INTEGER        NOT NULL,<br>    version_date   DATETIME       NOT NULL,<br>    descr           VARCHAR(25)<br>)<br>GRANT SELECT ON @DBSCHEMA@.NGN_SCHEMA<br>TO USER @APPUSER@; |

| Schema Version Information |
|---|
| CREATE TABLE @DBSCHEMA@.TABLE_ONE<br>(<br>    oid           CHAR(20)      NOT NULL,<br>    istatus      SMALLINT      NOT NULL,<br>    first_name   VARCHAR(80)   NOT NULL,<br>    middle_name  VARCHAR(80)   NOT NULL,<br>    last_name    VARCHAR(80)   NOT NULL,<br>IN TABLESPACE @SOMETABLESPACE@<br>GRANT SELECT ON @DBSCHEMA@.TABLE_ONE<br>TO USER @APPUSER@;<br>ALTER TABLE @DBSCHEMA@.TABLE_ONE ADD<br>CONSTRAINT XYZ PRIMARY KEY (oid);<br>) |

Notably, once the parameterized values have been inserted in one of the parameterized scripts 140, the script 140 can become a fully functional DDL script.

As it will be recognized by the skilled artisan, both schema names and application users can be parameterized in addition to the physical elements including the specification of a tablespace. In any case, simple token substitution can transform the logical model creation script illustrated above into a working DDL script. Before token substitution can be performed, however, first a proper physical database must be created through a processing of the parameterized physical data model 130. In further illustration, FIG. 2 is a schematic illustration of a system for processing each of the parameterized logical model creation scripts to create a database in the target platform.

Figure 2:
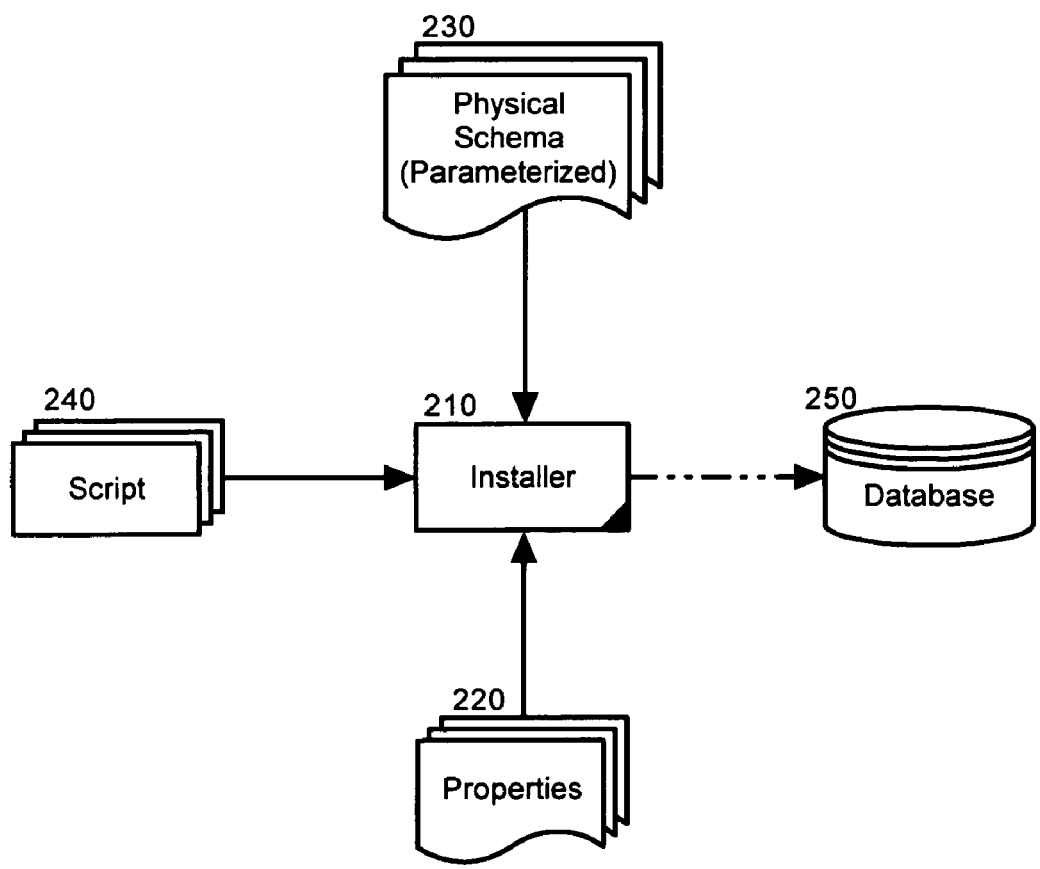
FIG. 2 is a schematic illustration of a system for processing parameterized scripts to create a database.

As shown in FIG. 2, an installer 210 can be coupled to each of the parameterized physical data model 230 and one or more properties files 220. The installer 210 can be configured both to create the individual databases 250 required by the scripts 240, and also to install the logical models described in the scripts 240. The installer 210 can perform the creation of each of the databases 250 and the subsequent installation of the logical models described in the scripts 240 sequentially, or concurrently. In any case, the properties files 220 can specified the desired values for the parameterized elements of the physical data model 230 for each target database 250. Using the properties files 220, the installer 210 can consolidate the physical specification of each database 250 with corresponding ones of the parameterized physical models 230 to produce the physical constructs necessary to the installation of the logical models expressed in the scripts 140.

Notably, once the physical constructs have been created in the respective databases 250, the logical models described by the parameterized scripts 240 can be implemented in the respective databases 250. Yet, complexities can arise where multiple logical models are designed to share selected physical models with others of the logical models. Complexities also can arise where multiple logical models are to share selected aspects of selected physical models with others of the logical models. Examples can include the common specification of bufferpools, tablespaces, and the like.

Figure 3:
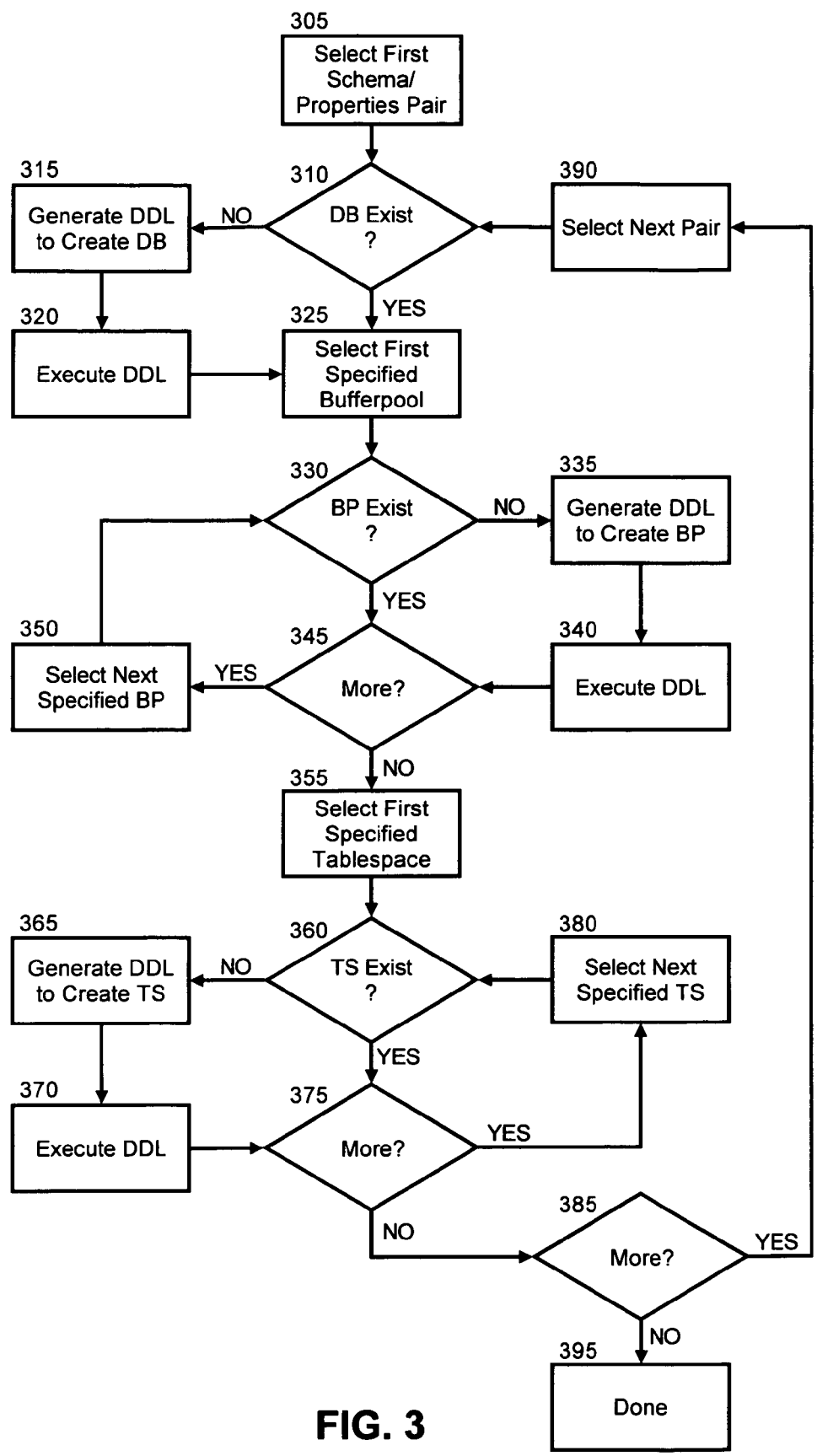
FIG. 3 is a flow chart illustrating a process for generating a physical model required to create the database of FIG. 2; and, FIG. 4 is a flow chart illustrating a process for generating a logical model required to create the database of FIG. 2.

To account for such complexities, the installer 210 of FIG. 2 can interepret the parameterized physical models 230 with the supplied property files 220 to create the physical constructs for subsequent logical model creation. To that end, FIG. 3 is a flow chart illustrating a process for generating a physical model required to create the database of FIG. 2. Beginning in block 305, a first parameterized physical model can be selected along with a corresponding properties specification. If in decision block 310 it is determined that a database does not exist for the model/properties pair, in block 315 a script can be created in which the properties of the pair can be substituted for the tokens in the model. Subsequently, the script can be executed to create the database in block 320.

In block 325, a first specified buffer pool in the parameterized physical model can be selected. If in decision 330 a buffer pool does not exist in the database as specified in the physical model, in block 335 a script can be generated for creating a buffer pool as described in the parameterized physical model using the properties specified by the properties file. Subsequently in block 340 the script can be executed to create the required buffer pool. Notably, if in decision block 345 additional buffer pools have been specified in the parameterized physical model, in block 350 the next specified buffer pool can be selected and the process can repeat in blocks 330 through 350.

Once in decision block 345 it is determined that no more buffer pools have been specified in the parameterized physical model, in block 355 the first specified tablespace can be selected. In block 360 if the tablespace does not already exist, in block 365 a script can be generated for creating a tablespace as described in the parameterized physical model using the properties specified by the properties file. Subsequently in block 370 the script can be executed to create the required tablespace. Notably, if in decision block 375 additional tablespaces have been specified in the parameterized physical model, in block 380 the next specified tablespace can be selected and the process can repeat in blocks 360 through 380.

Figure 4:
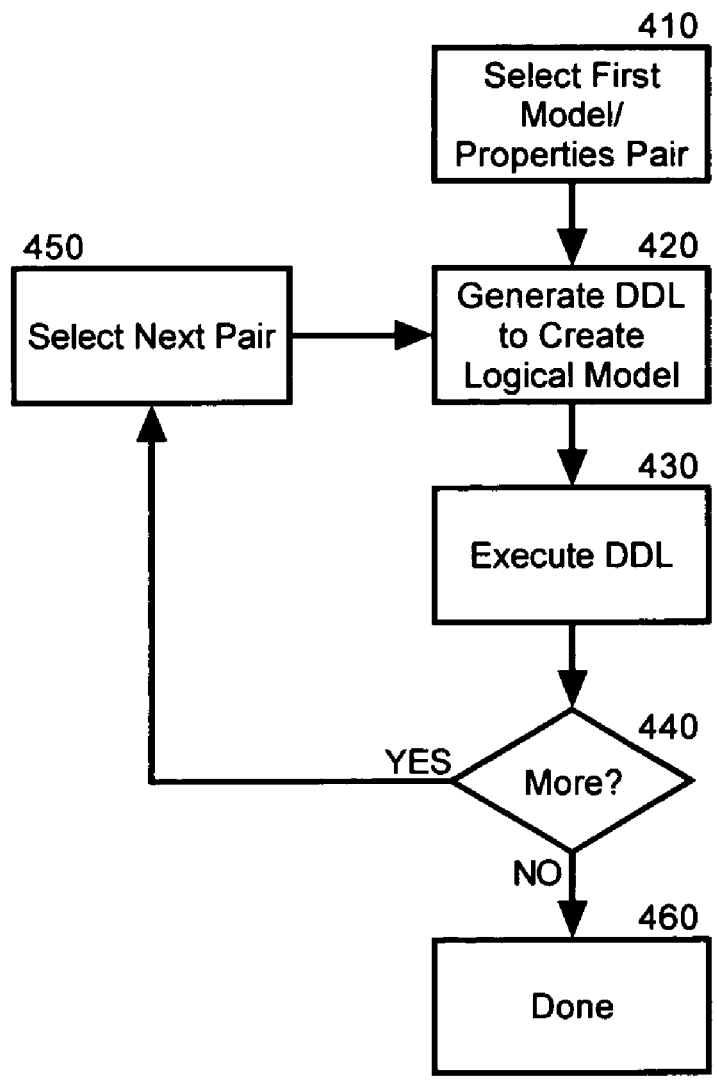

Once in decision block 375 it is determined that no more tablespaces have been specified in the parameterized physical model, in decision block 385 it can be determined if additional physical model/properties pairs remain to be processed. If so, the next pair can be selected in block 290 and the entirety of the process can repeat for the next pair of parameterized physical model and properties file. When no pairs remain, the process can end in block 395. Subsequently, the physical model having been created, the logical model can be created. In this regard, FIG. 4 is a flow chart illustrating a process for generating a logical model required to create the database of FIG. 2.

Beginning in block 410 a first pair of parameterized logical model and properties file can be selected. In block 420 an installation script can be generated for the logical model using token substitution for the physical specifications in the parameterized logical model. In block 430, the installation script can be executed to create the database. Subsequently, if in decision block 440 additional pairs of parameterized logical models and properties files remain to processed, in block 45 the next pair can be selected and the process can repeat in blocks 420 through 440. Once no pairs remain to be processed, the process can end in block 460.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A database creation system comprising:
   a parameterized physical data model associated with a corresponding properties file;
   a script generator configured to produce a parameterized logical data model creation script based upon a logical data model and said parameterized physical data model; and,
   an installer configured to process said parameterized logical data model to produce executable physical and logical data models for a target database platform based upon properties produced for said target database platform.

2. The system of claim 1, wherein said parameterized logical data model comprises a data definition language compliant script produced with parameterized values for particular physical aspects of said target database platform.

3. The system of claim 1, wherein said parameterized physical data model comprises parameterized aspects of said target database platform, said aspects comprising physical database specifications.

4. The system of claim 3, wherein said physical database specifications comprise at least one of buffer pool specifications and tablespace specifications.

5. A method for creating a database, the method comprising the steps of:
- first combining a parameterized description of a physical data model and a set of database specific properties to produce a physical database; and,
- second combining a parameterized description of a logical data model with said set of database specific properties to generate a logical model for said physical database.

6. The method of claim 5, wherein said first combining step comprises the step of creating at least one bufferpool in said physical database as specified by said properties.

7. The method of claim 5, wherein said first combining step comprises the step of creating at least one tablespace in said physical database as specified by said properties.

8. The method of claim 5, further comprising the step of configuring said parameterized description of a physical data model with at least one schema name for a table described in said parameterized description of a physical data model.

9. The method of claim 5, further comprising the step of configuring said parameterized description of a physical data model with at least one user name of a use authorized to access a table described in said parameterized description of a physical data model.

10. The method of claim 5, further comprising the step of repeating said first and second combining steps for multiple other databases having respective database specific properties.

11. A machine readable storage having stored thereon a computer program for creating a database, the computer program comprising a routine set of instructions which when executed by the machine cause the machine to perform the steps of:
- first combining a parameterized description of a physical data model and a set of database specific properties to produce a physical database; and,
- second combining a parameterized description of a logical data model with said set of database specific properties to generate a logical model for said physical database.

12. The machine readable storage of claim 11, wherein said first combining step comprises the step of creating at least one bufferpool in said physical database as specified by said properties.

13. The machine readable storage of claim 11, wherein said first combining step comprises the step of creating at least one tablespace in said physical database as specified by said properties.

14. The machine readable storage of claim 11, further comprising the step of configuring said parameterized description of a physical data model with at least one schema name for a table described in said parameterized description of a physical data model.

15. The machine readable storage of claim 11, further comprising the step of configuring said parameterized description of a physical data model with at least one user name of a use authorized to access a table described in said parameterized description of a physical data model.

16. The machine readable storage of claim 11, further comprising the step of repeating said first and second combining steps for multiple other databases having respective database specific properties.

* * * * *